United States Patent
Koli et al.

(10) Patent No.: US 10,037,157 B1
(45) Date of Patent: Jul. 31, 2018

(54) TECHNIQUES FOR MIGRATING TO A THINLY-PROVISIONED LOGICAL DISK WITHOUT WRITING ZERO BLOCKS

(71) Applicant: EMC IP Holding Company LLC, Hopkinton, MA (US)

(72) Inventors: Milind M. Koli, Morrisville, NC (US); Timothy C. Ng, Cary, NC (US)

(73) Assignee: EMC IP Holding Company LLC, Hopkinton, MA (US)

(*) Notice: Subject to any disclaimer, the term of this patent is extended or adjusted under 35 U.S.C. 154(b) by 14 days.

(21) Appl. No.: 15/389,124

(22) Filed: Dec. 22, 2016

(51) Int. Cl.
*G06F 3/06* (2006.01)

(52) U.S. Cl.
CPC .......... *G06F 3/0619* (2013.01); *G06F 3/0665* (2013.01); *G06F 3/0689* (2013.01)

(58) Field of Classification Search
CPC .... G06F 3/0619; G06F 3/0665; G06F 3/0689; G06F 2212/313
See application file for complete search history.

(56) References Cited

U.S. PATENT DOCUMENTS

| | | | |
|---|---|---|---|
| 8,868,877 B2 * | 10/2014 | Domsch | G06F 3/0604 711/154 |
| 9,122,689 B1 | 9/2015 | Bono et al. | |
| 9,229,656 B1 | 1/2016 | Contreras et al. | |
| 9,274,708 B2 * | 3/2016 | Goodman | G06F 3/0655 |
| 9,594,795 B1 | 3/2017 | Koli et al. | |
| 9,612,756 B1 | 4/2017 | Koli et al. | |
| 9,830,105 B1 | 11/2017 | Tummala et al. | |
| 9,916,244 B1 | 3/2018 | Tolvanen et al. | |
| 2010/0205390 A1 * | 8/2010 | Arakawa | G06F 3/0607 711/162 |
| 2010/0306291 A1 * | 12/2010 | Craske | G06F 5/00 708/209 |
| 2016/0232206 A1 * | 8/2016 | Hayamizu | G06F 17/30477 |
| 2017/0124112 A1 * | 5/2017 | Vaghani | G06F 17/30174 |

OTHER PUBLICATIONS

Lili Chen et al.; "Zero on Demand Operations Based on Zeroed Chunk Tables of Storage Drive Objects Stored in Main Memory," U.S. Appl. No. 14/750,441, filed Jun. 25, 2015.
(Continued)

*Primary Examiner* — Mano Padmanabhan
*Assistant Examiner* — Patrick Borges
(74) *Attorney, Agent, or Firm* — BainwoodHuang (57) ABSTRACT

Techniques are provided for implementing a zero detection feature in the middle of a I/O driver stack that is able to function properly on migration of a thickly-provisioned logical disk to a thinly-provisioned logical disk. This may be accomplished by creating the destination thinly-provisioned logical disk with a Zero Detect mode that is initially set to active upon a migration. The zero detection feature implemented in the middle of the I/O driver stack is configured to require any writes to a logical disk to be buffered when that logical disk is in active Zero Detect mode, and to automatically apply zero detection to such writes to prevent writing entire blocks of zeroes. The Zero Detect mode may then be set to passive upon completion of the migration, allowing zero detection to be applied only to select write operations in the normal course of operation.

12 Claims, 5 Drawing Sheets

(56) References Cited

OTHER PUBLICATIONS

Alan L. Taylor et al.; "Managing Data Storage Migration for Virtual Machines," U.S. Appl. No. 14/754,961, filed Jun. 30, 2015.
Saar Cohen et al.; "Non-Disruptively Migrating Virtual Disks Using Virtualization Appliance," U.S. Appl. No. 14/984,219, filed Dec. 30, 2015.
Yossef Saad et al.; "Storage Performance Testing to Evaluate Moving Data Among Arrays," U.S. Appl. No. 14/980,501, filed Dec. 28, 2015.
Milind M. Koli et al.; "Data Storage System With Dynamic Throttling of Parellel Sub-I/O Requests for Individual Host I/O Requests," U.S. Appl. No. 14/972,418, filed Dec. 17, 2015.
Milind M. Koli et al.; "Data Storage System With Efficient Processing of Single Mapping Callback for Host I/O Requests," U.S. Appl. No. 14/972,421, filed Dec. 17, 2015.
Milind M. Koli et al.; "Pairing of Data Storage Requests," U.S. Appl. No. 15/199,166, filed Jun. 30, 2016.
Milind M. Koli et al.; "Techniques for Performing Data Storage Copy Operations in an Integrated Manner," U.S. Appl. No. 15/199,192, filed Jun. 30, 2016.
Alan L. Taylor et al.; "Efficient Cloning and Migration of Data Objects," U.S. Appl. No. 15/281,963, filed Sep. 30, 2016.
Milind M. Koli et al.; "Techniques for Splitting Up I/O Commands in a Data Storage System," U.S. Appl. No. 15/394,422, filed Dec. 29, 2016.

\* cited by examiner

TECHNIQUES FOR MIGRATING TO A THINLY-PROVISIONED LOGICAL DISK WITHOUT WRITING ZERO BLOCKS

BACKGROUND

Data storage systems (DSSes) are integrated systems that allow persistent data storage to be presented to remote host devices in an efficient manner. A host may transmit data storage commands to the DSS for processing. A DSS may be configured as one or more storage processors attached to underlying persistent storage, each storage processor being configured to process data storage commands.

Data of a DSS may be organized into logical disks. These logical disks may either be thickly or thinly provisioned. A thickly provisioned logical disk has a fixed size with pre-allocated backing store. A thinly-provisioned logical disk is resizable as needed, with backing store being allocated on-the-fly.

SUMMARY

Unfortunately, the above-described techniques may suffer from deficiencies. For example, if a thickly-provisioned logical disk is migrated to a thinly-provisioned logical disk, the space and efficiency savings may not be realized on the thinly-provisioned disk, because empty blocks may be copied from the source thickly-provisioned logical disk to the destination thinly-provisioned logical disk. This often happens as older data storage systems are migrated that used thickly-provisioned logical disks by default to newer data storage systems that used thinly-provisioned logical disks by default, but the benefit of the default thin provisioning is not realized for these migrated logical disks.

A zero detection feature could, in principle, be used to detect empty blocks in order to avoid writing those blocks. However, a zero detection feature is most efficiently implemented in the middle of an I/O driver stack by scanning blocks of a write buffer for zeroes. Unfortunately, if an unbuffered write is used (e.g., a data-copy-avoidance write in which data is reassigned to a new logical address), the zero detection feature will not work because no buffer is available to the zero detection feature in the middle of the stack. Because many systems now use unbuffered writes by default for efficiency reasons, many migrations will fail to take advantage of a zero detection feature implemented in the middle of a I/O driver stack.

Thus, it would be desirable to implement a zero detection feature in the middle of a I/O driver stack that is able to function properly on migration of a thickly-provisioned logical disk (or a thinly-provisioned logical disk that inefficiently contains empty blocks) to a thinly-provisioned logical disk. This may be accomplished by creating the destination thinly-provisioned logical disk with a Zero Detect mode that is initially set to active upon a migration. The zero detection feature implemented in the middle of the I/O driver stack is configured to require any writes to a logical disk to be buffered when that logical disk is in active Zero Detect mode, and to automatically apply zero detection to such writes to prevent writing entire blocks of zeroes. The Zero Detect mode may then be set to passive upon completion of the migration, allowing zero detection to be applied only to select write operations in the normal course of operation.

In one embodiment, a method of storing data in the data storage system (DSS) is performed. The method includes (a) in response to receiving, by a mapping driver of the DSS, a first write command that (i) identifies, as its target, a first thinly-provisioned logical disk of storage (LUN) that is in a passive zero-detect mode, (ii) includes an inactive zero-detect flag, and (iii) includes a first instruction to write a first block of data to a first address of the first thinly-provisioned LUN, the first block of data being entirely zeroes: (A) writing the first block of data to backing store of the first address of the first thinly-provisioned LUN and (B) successfully completing the first write command, (b) in response to receiving, by the mapping driver, a second write command that (i) identifies, as its target, the first thinly-provisioned LUN which is in the passive zero-detect mode, (ii) includes a active zero-detect flag, and (iii) includes a second instruction to write a second block of data to a second address of the first thinly-provisioned LUN, the second block of data being entirely zeroes: (A) deallocating a block of backing store of the first thinly-provisioned LUN at the second address and (B) successfully completing the second write command while refraining from writing the second block of data to backing store of the second address of the first thinly-provisioned LUN, and (c) in response to receiving, by the mapping driver, a third write command that (i) identifies, as its target, a second thinly-provisioned LUN which is in an active zero-detect mode, and (ii) includes a third instruction to write a third block of data to a third address of the second thinly-provisioned LUN, the third block of data being entirely zeroes: (A) deallocating a block of backing store of the second thinly-provisioned LUN at the third address regardless of a state of a zero-detect flag of the third write command and (B) successfully completing the third write command while refraining from writing the third block of data to backing store of the third address of the second thinly-provisioned LUN. An apparatus, system, and computer program product for performing a similar method are also provided.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views.

DETAILED DESCRIPTION

Embodiments are directed to techniques for implementing a zero detection feature in the middle of a I/O driver stack that is able to function properly on migration of a thickly-provisioned logical disk (or a thinly-provisioned logical disk that inefficiently contains empty blocks) to a thinly-provisioned logical disk. This may be accomplished by creating the destination thinly-provisioned logical disk with a Zero Detect mode that is initially set to active upon a migration. The zero detection feature implemented in the middle of the I/O driver stack is configured to require any writes to a logical disk to be buffered when that logical disk is in active Zero Detect mode, and to automatically apply zero detection to such writes to prevent writing entire blocks of zeroes. The Zero Detect mode may then be set to passive upon completion of the migration, allowing zero detection to be applied only to select write operations in the normal course of operation.

Figure 1:
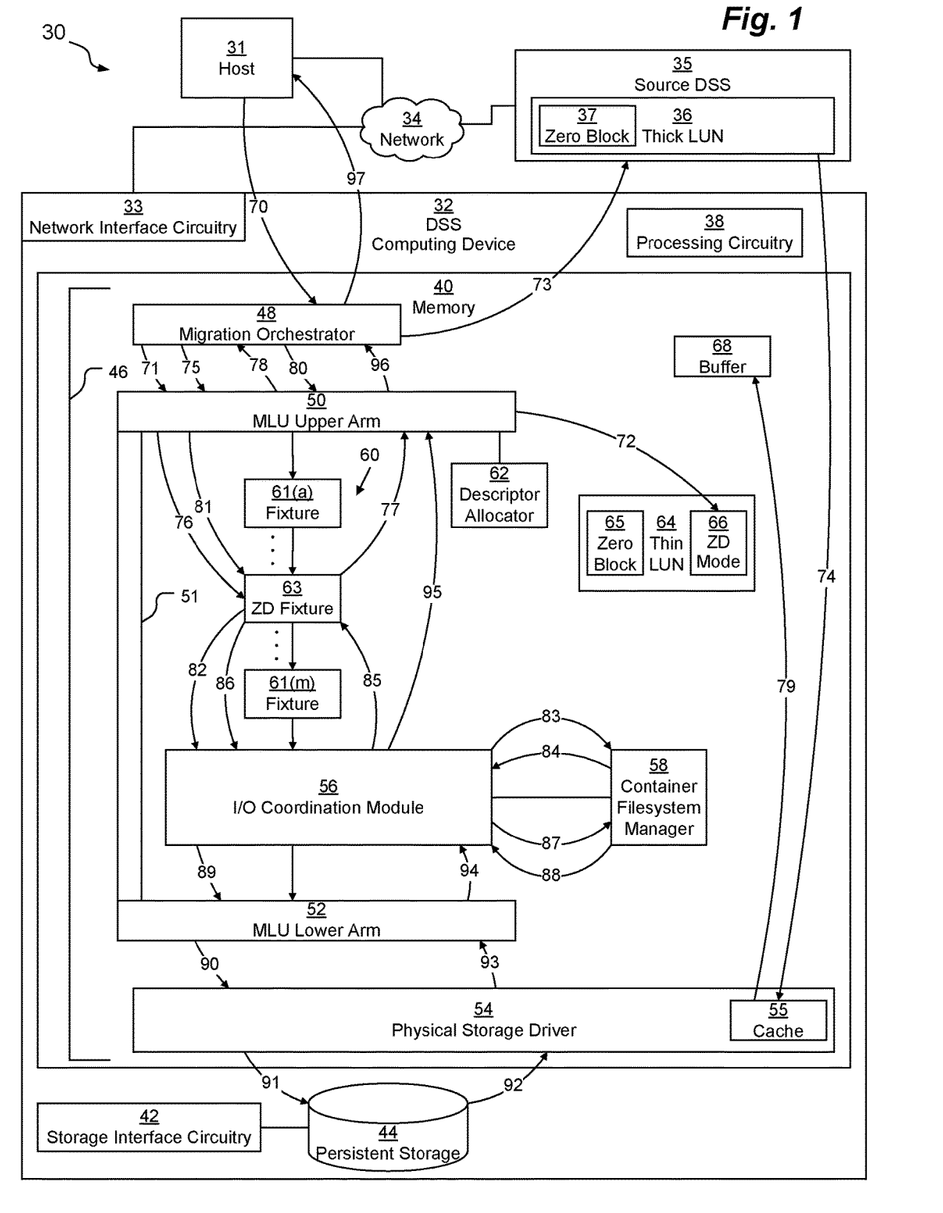
FIG. 1 is a block diagram depicting an example system and apparatus for use in connection with various embodiments.

FIG. 1 depicts a system 30. System 30 includes a computing device 32 serving as a data storage system (DSS), a network 34, and one or more hosts 31 that may serve as initiators of commands to the DSS computing device 32 over the network 34.

In some embodiments, system 30 may also include one or more other DSSes, such as a source DSS 35. As depicted, source DSS 35 stores a thickly-provisioned logical unit (LUN) 36, which is a type of logical disk. Thickly-provisioned LUN 36 includes at least one zero block 37, which is a block that contains all zeroes but nevertheless is backed by physical storage. In some embodiments, a thinly-provisioned LUN may replace the thickly-provisioned LUN 36 provided that it contains at least one zero block 37 that is backed by physical storage. In some embodiments, instead of the thickly-provisioned LUN 36 having the at least one zero block 37 is stored on the DSS computing device 32 rather than on the source DSS 35.

Computing device 32 may be any kind of computing device, such as, for example, a personal computer, workstation, server computer, enterprise server, DSS rack server, laptop computer, tablet computes, smart phone, mobile computer, etc. Typically, computing device 32 is a DSS rack server.

Host 31 may be any kind of computing device capable of sending data storage commands to computing device 32 over network 34, such as, for example, a personal computer, workstation, server computer, enterprise server, laptop computer, tablet computes, smart phone, mobile computer, etc. Typically, host 31 is a workstation, server computer, or enterprise server. In some embodiments, host 31 may run a hypervisor (not depicted), allowing various virtual machines (not depicted) to execute in a virtualized environment (not depicted) thereon.

The network 34 may be any type of network or combination of networks, such as a storage area network (SAN), a local area network (LAN), a wide area network (WAN), the Internet, and/or some other type of network or combination of networks, for example. The hosts 31 and DSSes 32, 35 may connect to the network 34 using various technologies, such as Fibre Channel (FC), iSCSI, NFS, SMB 3.0, and CIFS, for example. Any number of hosts 31 and DSSes 32, 35 may be provided, using any of the above protocols, some subset thereof, or other protocols besides those shown.

DSS computing device 32 includes network interface circuitry 33, processing circuitry 38, storage interface circuitry 42, persistent data storage 44, and memory 40. DSS computing device 32 may also include other components as are well-known in the art, including interconnection circuitry.

Network interface circuitry 33 may include one or more Ethernet cards, cellular modems, FC adapters, Wireless Fidelity (Wi-Fi) wireless networking adapters, and/or other devices for connecting to network 34. Processing circuitry 38 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Persistent storage 44 may include any kind of persistent storage devices, such as, for example, hard disk drives, solid-state storage devices, flash drives, etc. Storage interface circuitry 42 controls and provides access to persistent storage 44. Storage interface circuitry 42 may include, for example, SCSI, SAS, ATA, SATA, Fibre Channel (FC), and/or other similar controllers and ports. Persistent storage 44 may be arranged in various configurations, such as, for example in RAID groups that provide storage striped or mirrored across several disks (with optional parity data, e.g., in RAID-5) as RAID disks. In some embodiments, each RAID disk may be subdivided into Flare LUNs, which may themselves be subdivided into slices (not depicted) of, for example, 256 MB or 1 gigabyte size. These slices may be assigned as backing store to a container filesystem manager 58 (e.g., the Common Block Filesystem provided by EMC Corp. of Hopkinton, Mass.). Container filesystem manager 58 manages one or more files backed by these slices in a mapped manner, and a mapping driver 51 is then able to present one or more of these files to hosts 31 as one or more respective logical disks. In other embodiments, one or more of the logical disks presented by the mapping driver are used as volumes on which an upper-deck filesystem is stored. In these embodiments, these upper-deck filesystems are presented to hosts 31 rather than the underlying logical disks.

Memory 40 may be any kind of digital system memory, such as, for example, random access memory (RAM). Memory 40 stores one or more operating systems (OSes) in operation (e.g., Linux, UNIX, Windows, MacOS, or a similar operating system; not depicted), various applications (not depicted) executing on processing circuitry 38, and various drivers 48, 51, 54, 56, 61, 62, 63 (and their respective subcomponents) some of which may be arranged in a driver stack 46. Memory 40 also includes a container filesystem manager 58 in operation.

In some embodiments, memory 40 may also include a persistent storage portion (not depicted). Persistent storage portion of memory 40 may be made up of one or more persistent storage devices, such as, for example, disks. Persistent storage portion of memory 40 or persistent storage 44 is configured to store programs and data even while the DSS computing device 32 is powered off. The OS and the applications are typically stored in this persistent storage portion of memory 40 or in persistent storage 44 so that they may be loaded into a system portion of memory 40 from this persistent storage portion of memory 40 or persistent storage 44 upon a system restart. These applications and drivers 48, 50, 51, 52, 54, 56, 58, 61, 62, 63 when stored in non-transient form either in the volatile portion of memory 40 or in persistent storage 44 or in persistent portion of memory 40, form a computer program product. The processing circuitry 38 running one or more of these applications or drivers 48, 50, 51, 52, 54, 56, 58, 61, 62, 63 thus forms a specialized circuit constructed and arranged to carry out the various processes described herein.

Memory 40 stores at least two drivers 51, 54 that operate as part of storage driver stack 46. At the top of driver stack 46 is a mapping driver 51 (also referred to as the MLU), and at the bottom of the driver stack 46 is a physical storage driver 54 that is able to communicate with the storage interface circuitry 42, providing the MLU 51 with access to the individual slices, FLUs, and RAID disks of persistent storage 44. Physical storage driver 54 may also include a cache 55 to allow data to be written quickly without the need to allocate backing store right away. In some embodiments there may be additional drivers (not depicted) within driver stack 46 above and/or below the MLU 51.

MLU 51 is a multi-part driver having an upper arm 50 and a lower arm 52. In addition, MLU 51 is arranged in a "C-Clamp" configuration, allowing it to communicate with various other software modules without using inter-driver communication. A fixture stack 60 includes a stack of fixture modules 61 (depicted as fixtures 61(a), . . . , 61(m)). One driver within the fixture stack is a Zero Detect fixture driver (ZD fixture) 63. I/O Coordination module 56 sits at the bottom of the fixture stack 60. Upper arm 50 is able to send I/O descriptors, which it obtains from descriptor allocator module 62, down the fixture stack 60 towards the lower arm 52. This allows the various fixtures 61, 63 and I/O Coordination module 56 to make various changes and translations to storage operations prior to final processing by the lower arm 52 of the MLU 51. Fixtures 61 typically perform services ancillary to storage. An example fixture 61 is a compression module, while another example fixture is a de-duplication module.

Memory 40 also stores a migration orchestrator program (MO) 48.

In operation, host 31 sends a migration command 70 to migrate a thick LUN 36 to a new thinly-provisioned LUN 64 on the DSS computing device 32. In some embodiments, the migration command 70 may instead indicate that the source for the migration operation be another LUN (not depicted) on the DSS computing device itself. In some embodiments, the migration command 70 may instead indicate that the source for the migration operation be another thinly-provisioned LUN (not depicted) either on the DSS computing device 32 or on another source DSS 35. Regardless of whether the source LUN is thin or thick, it contains at least one zero block 37.

In response to migration command 70, MO 48 sends an instruction 71 to the MLU 51 instructing that a new thinly-provisioned LUN 64 be created with various parameters (e.g., size, storage tier, etc., not depicted) matching the setup parameters of the source thick LUN 36. MLU 51 creates the thin LUN 64 and sets (via signal 72) a Zero Detect mode 66 of the new thin LUN 64 to be in an active mode. Being in the active Zero Detect mode 66 means that whenever any write command directed at that thin LUN 66 reaches ZD fixture 63, the ZD fixture 63 performs a zero detection operation on the write command to detect the presence of any zero blocks 65 to be written to the thin LUN 64. In the event that the write command is unbuffered so that the ZD fixture 63 does not have access to the data to be written (which means that it cannot detect a zero block 65), ZD fixture will fail the write command.

In the event that the thick LUN 36 is on a remote source DSS 35, MO 48 sends a read request 73 to read a portion of the data from the thick LUN 36 into cache 55. Read request 73 may be, for example, a SCSI read request if thick LUN 36 is block-based or it may be an NFS or CIFS read command if an upper-deck filesystem rests on thick LUN 36, in which case that thick LUN 36 is only presented to host as a filesystem volume. In response, source DSS 35 sends the requested portion of the data 74 from the thick LUN 36 to the DSS computing device 32 to be stored in cache 55. In some embodiments (e.g., in embodiments in which a local thick LUN 36 is destroyed upon migration and its backing store reassigned to thin LUN 64 by doing a data-copy-avoidance write), in the event that the thick LUN 36 is local to DSS computing device 32, this initial read may be omitted.

MO 48 then sends a write command 75 to MLU 51 to write the portion of data 74 stored in cache 55 to thin LUN 64. Because the write command 75 is based on data 74 already in cache 55 of the physical storage driver 54, MO 48 sends write command 75 as a data-copy-avoidance write, so that physical storage driver 54 may just reassign the structures within cache 55 that hold the data 74 to instead become part of thin LUN 64. Although this data 74 will eventually be written to persistent storage 44, the write can be sped up by temporarily storing the data 74 within a datalog of memory 40. This allows allocation of backing store for the thin LUN 64 to be put off until later. Write command 75 may take the form of an I/O Request Packet (IRP) holding an IOCTL or DeviceIoControl system call as is well-known in the art.

In order to fulfill the write command 75, upper arm 50 creates (e.g., by calling descriptor allocator 62) an I/O descriptor data structure (IOD) 76 and sends it down the fixture stack 60 to the I/O Coordination module 56. In one embodiment, an IOD 76 has a stacked data structure with a public field at the top and a set of private fields that hold data specific to specific fixtures 61, 63 in the fixture stack 60. In addition, there may be shared fields between the private fields that allow adjacent fixtures 61, 63 to pass information from one to the next. The private field of the IOD 76 associated with the I/O coordination module 56 includes a reference to the portion of the data 74 stored in cache 55.

Upon reaching ZD fixture 63, IOD 76 halts because it is directed to a thin LUN 64 that is in the active ZD mode 66 but, since it is a data-copy-avoidance write, which is unbuffered, and since only the I/O coordination module 56 has access to the data 74 in cache 55, ZD fixture 63 is not able to determine if any of the blocks within the data 74 are zero blocks 65. Therefore, ZD fixture 63 sends a failure signal 77 (which may take the same form as IOD 76, but with a failure marker) up the fixture stack 60 to the upper arm 50. Upper arm 50 then sends a failure signal 78 (which may take the form of an IRP) back to MO 48.

Because data-copy-avoidance write command 75 failed, MO 48 reissues it as a buffered write command 80. First, however, MO 48 directs the physical storage driver 54 to send a copy 79 of the data 74 in the cache 55 to a buffer 68. MO 48 then sends buffered write command 80 down to the MLU 51 with the buffer 68. As before, buffered write command 80 may take the form of an IRP holding an IOCTL or DeviceIoControl system call as is well-known in the art.

In some embodiments, MO 48 may omit initially sending the unbuffered write command 75 and simply send the buffered write command 80 from the start.

In order to fulfill the write command 80, upper arm 50 again creates (e.g., by calling descriptor allocator 62) an IOD 81 and sends it down the fixture stack 60 to the I/O Coordination module 56. As before, IOD 81 may have a stacked data structure with a public field at the top and a set of private fields that hold data specific to specific fixtures 61, 63 in the fixture stack 60. In addition, there may be shared fields between the private fields that allow adjacent fixtures 61, 63 to pass information from one to the next.

Upon reaching ZD fixture 63, IOD 76 is now able to process the IOD 81 because although it is directed to a thin LUN 64 that is in the active ZD mode 66, since it is a buffered write, ZD fixture 63 has access to the buffer 68, so it is able to determine if any of the blocks within the data 79 are zero blocks 65. If there are any zero blocks 65, then ZD fixture 63 may split up the IOD 81 into two separate IODs 82, 86. IOD 82 is a deallocation descriptor directed at the zero blocks 65, while IOD 86 is a write IOD directed at the blocks of the data 79 that are not zero blocks 65. ZD fixture 63 may send these IODs 82, 86 down the remainder of the fixture stack 60 in either order, but typically, ZD fixture 63 sends IOD 82 first.

ZD fixture 63 sends IOD 82 down the remainder of fixture stack 60 to I/O coordination module 56. I/O Coordination module 56, upon receiving IOD 82, because IOD 82 is a deallocation command that does not require any writes to be performed by the physical storage driver 54, coordinates with container filesystem manager 58 to deallocate (or confirm deallocation of) zero blocks 65 within thin LUN 64. Thus, I/O Coordination module 56 sends a Map_for_Deallocate command 83 to container filesystem manager 58. In response, container filesystem manager 58 deallocates backing store for the zero blocks 65 within thin LUN 64 and sends back a Map_for_Deallocate response 84. In some embodiments, this is followed by a commit command and response. Then, I/O coordination module 56 sends a completion signal 85 (which may take the same form as IOD 82, but with a success marker) up the fixture stack 60 to the ZD fixture 85.

In response, ZD fixture 63 sends IOD 86 down the remainder of fixture stack 60 to I/O coordination module 56. I/O coordination module 56 serves to coordinate storage-related operations between the MLU 51 and the container filesystem manager 58. Thus, when it receives the IOD 86 it sends a Map_for_Write command 87 to container filesystem manager 58 in order to obtain a disparate write buffer 88 in response. Disparate write buffer 88 contains mapping of the logical locations of the blocks in thin LUN 64 to physical locations within persistent storage 44 or within cache 55. This disparate write buffer 88 may take the form of a set of extent descriptors (not depicted).

I/O Coordination module 56 sends a write instruction 89 down to lower arm 52. In some embodiments, the write instruction 89 includes the disparate write buffer 88, while in other embodiments, the write instruction 89 includes a pointer to the disparate write buffer 88. Lower arm 52 is then able to use this information to send at least one inter-driver write command 90 down the driver stack 46 to the physical driver 54. Inter-driver write command 90 may take the form of an IRP holding an IOCTL or DeviceIoControl system call. In some embodiments, one inter-driver write command 90 may include write commands for several extents from the disparate write buffer 88. In other embodiments, lower arm 52 issues a separate inter-driver write command 90 for each such extent.

In any case, physical storage driver 54 performs the one or more inter-driver write commands 90 by sending one or more low-level write commands 91 (or constituent sub-commands) to persistent storage 44, receiving low-level write responses 92 in response. Then, physical storage driver 54 is able to issue a response 93 for each write instruction 90 back to the lower arm 52, which, in turn sends a response 94 up to the I/O Coordination module 56. I/O Coordination module 56 may then repeat for each remaining identified allocated physical extent. In some embodiments, instead of fulfilling one or more of the inter-driver write commands 90 by sending a low-level write command 91 to persistent storage 44, temporary fulfillment may be made by writing to a datalog of cache 55, enabling a faster response (although it will eventually be written to persistent storage 44).

Once I/O Coordination module 56 completes the copy for all of the identified allocated physical source extents 134, it may send a completion IOD 95 back up the fixture stack 60 to the upper arm 50 to indicate completion (whether success or failure) of IOD 76. In some embodiments, this may involve first sending a completion IOD (not depicted) up to the ZD fixture 63, which, in turn, upon receiving both the completion signal 85 and the completion IOD, sends the completion IOD 95 up to the upper arm 50.

Upper arm 50 then sends a completion signal 96 (which may take the form of an IRP) back to MO 48. In some embodiments, MO 48 may, at this point continue to read more data 74 from thick LUN 36 by way of a new read request 73, and then repeat until all data has been written to thin LUN 64. Once the migration has completed, MO 48 may, in some embodiments, send a completion signal 97 back to host 31.

Figure 2:
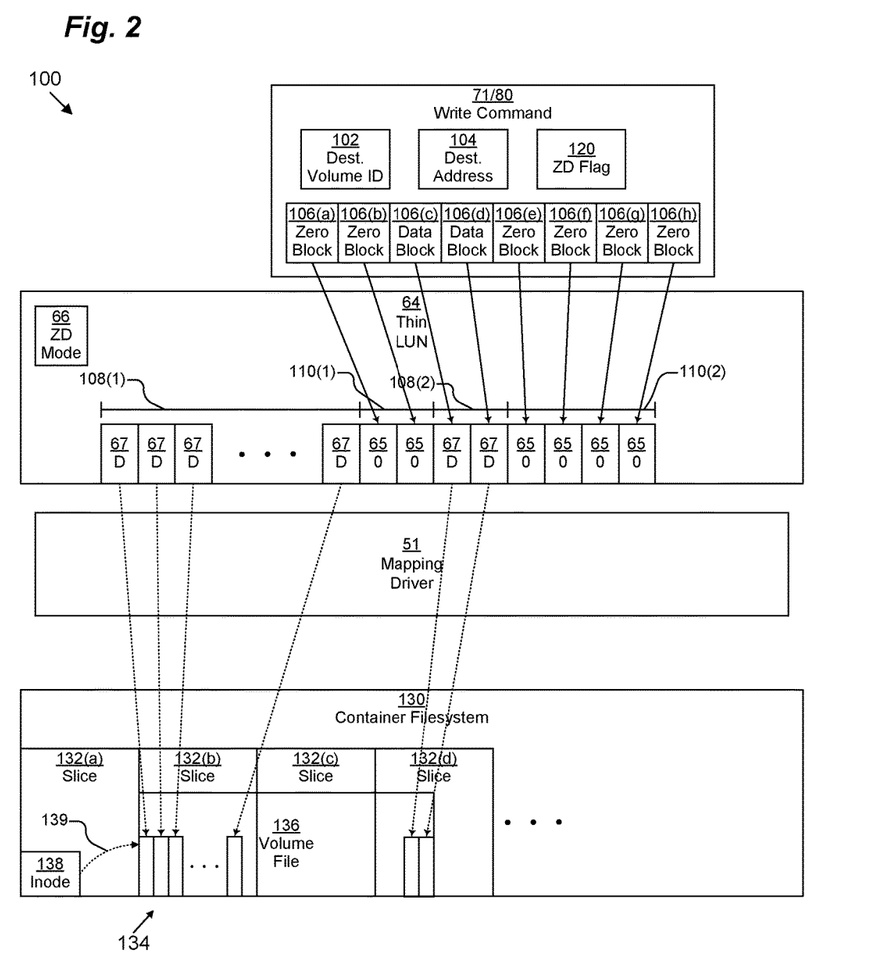
FIG. 2 is a block diagram depicting an example relationship between data structures for use in connection with various embodiments.

FIG. 2 illustrates an example arrangement 100 of thin LUN 64 and its mapping. Thin LUN 64 is made up of a set of data blocks 67 interspersed with zero blocks 65. For example, in one arrangement thin LUN 64 may have a logical size of 4 gigabytes, addressable as 524,288 blocks 65, 67, each block 65, 67 being 8 kilobytes in size. However, since there are zero blocks 65, which are made up of only zeroes, the actual space on persistent storage 44 used by the thin LUN 64 may be considerably smaller than 4 gigabytes.

Each non-zero data block 67 of thin LUN 64 is backed by a block 134 on a container filesystem 130, as mapped by MLU 51. Container filesystem 130 is provisioned with slices 132 (depicted as slices 132(a), 132(b), 132(c), 132(d), ... ) from persistent storage 44 by container filesystem manager 58. Each slice 132 is subdivided into blocks 134 (e.g., 8 kilobytes each). A volume file 136 made up of blocks 134 maps to thin LUN 64 as backing store. An inode 138 (and its associated indirect blocks as is well-known in the art) may define which blocks 134 are part of the volume file 136 through a set of pointers 139. Thus, each non-zero data block 67 is backed by a block 134, while each zero block 65 is not backed by any storage.

An extent 108 of non-zero data blocks 67 may be backed by an extent of blocks 134 on container filesystem. It is possible (not depicted) to have two extents 108 which are adjacent within the address space of thin LUN 64 which are backed by extents of blocks 134 that are not adjacent within the address space of container filesystem 130. An extent 110 of zero blocks 65 is not mapped to any extent of blocks 134 on container filesystem 130.

As depicted, extent 108(1) on thin LUN 64 is mapped to an extent of blocks 134 of volume file 136 on container filesystem 130 that are all provided by slice 132(b). Extent 110(1) includes two zero blocks 65 with no backing store. Extent 108(2) on thin LUN 64 is mapped to an extent of blocks 134 of volume file 136 on container filesystem 130 that are all provided by slice 132(d). Extent 110(2) includes four zero blocks 65 with no backing store.

Thin LUN 64 also includes a zero-detect mode 66 flag that can be set to active or passive. When thin LUN 64 is in active mode, any buffered write command 80 that is received by MLU 51 directed to that thin LUN 64 will, upon being translated into a write IOD 81 and received by ZD fixture 63, be scanned for zero blocks 65 for unmapping. However, if thin LUN 64 is in passive mode, any buffered write command 80 that is received by MLU 51 directed to that thin LUN 64 will, upon being translated into a write IOD 81 and received by ZD fixture 63, be scanned for zero blocks 65 only if a zero-detect flag 120 is set to affirmative for that write command 80.

Upon buffered write command 71, 80 coming into MLU 51 and being forwarded to ZD fixture 63 as write IOD 76, 81, if either the ZD mode 66 of a thin LUN 64 identified by the destination volume identifier 102 of that write command 71, 80 is set to active or the ZD flag 120 of that write command 71, 80 is set to affirmative, then ZD fixture 63 will detect zero blocks 65 and direct I/O coordination module 56 to unmap those blocks. As depicted in FIG. 2, write command 71, 80 has a length of eight blocks 106. Blocks 106(a), 106(b), 106(e), 106(f), 106(g), 106(h) are zero blocks 65, which are not mapped to any backing store. However, blocks 106(c), 106(d) do map to data blocks 67 of extent 108(2), which themselves map to blocks 134 on slice 132(d).

Figure 3:
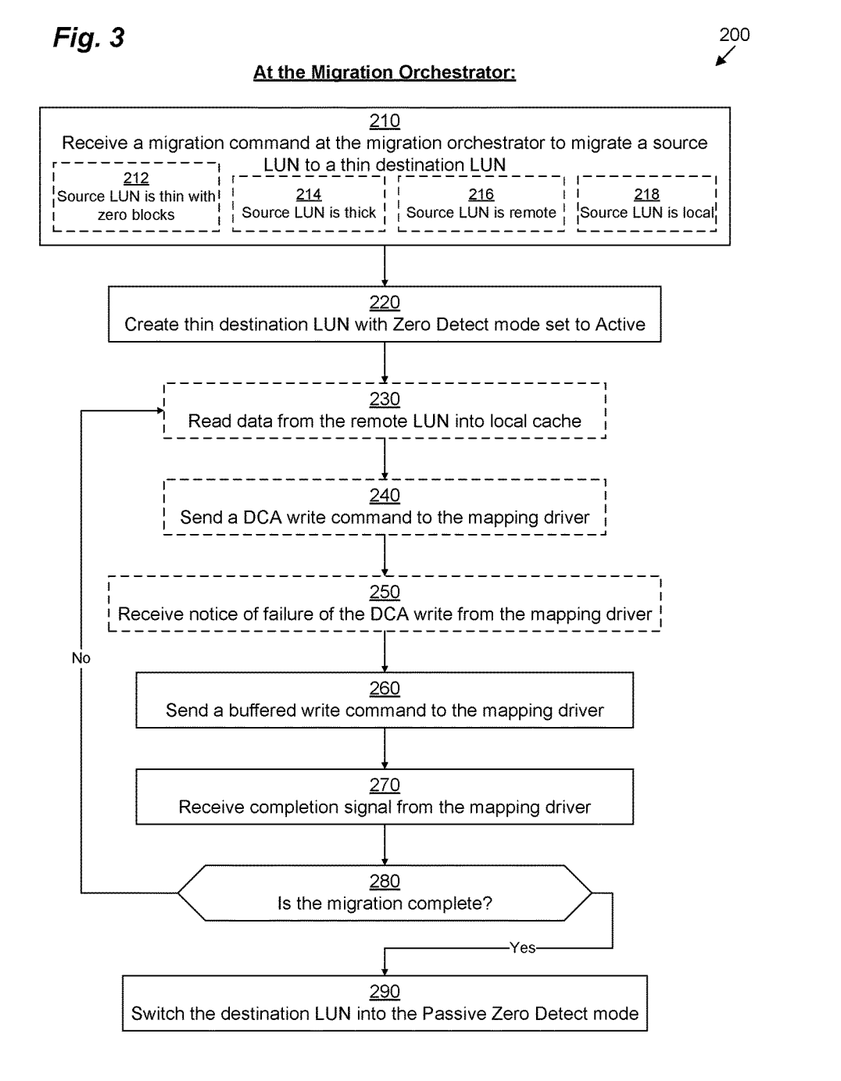
FIG. 3 is a flowchart depicting example methods of various embodiments.

FIG. 3 illustrates an example method 200 performed by MO 48 of DSS computing device 32. It should be understood that any time a piece of software (e.g., MO 48; drivers 51, 54 or their components; fixtures 61, 63; I/O Coordination module 56; container filesystem manager 58; etc.) is described as performing a method, process, step, or function, in actuality what is meant is that the computing device 32 on which that piece of software is running performs the method, process, step, or function when executing that piece of software on its processing circuitry 38.

It should be understood that, within FIG. 3, steps 230-250 are drawn with a dashed border because they may be considered optional, depending in the embodiment. In addition, sub-steps 212, 214, 216, and 218 are drawn with a dashed border because they represent various scenarios in which method 200 may be employed. In addition, one or more of the other steps or sub-steps of method 200 may also be omitted in some embodiments. Similarly, in some embodiments, one or more steps or sub-steps may be combined together or performed in a different order. Method 200 is performed by DSS computing device 32, more specifically by MO 48 running on processing circuitry 38 in conjunction with various other system components.

In step 210, MO 48 receives a migration command 70 from a host 31. The migration command 70 instructs the MO to orchestrate a migration of a source LUN to a destination thin LUN 64 on the DSS computing device 32.

Sub-steps 212, 214 represent two alternate scenarios in which method 200 may be employed. In sub-step 212, the source LUN is a thin LUN that happens to have at least one (or, more commonly, many more than one) zero block 37. In sub-step 214, the source LUN is a thick LUN 36. Since it is thickly-provisioned, unless it happens to be completely full, thick LUN 36 will generally have at least one (or, more commonly, many more than one) zero block 37. For the sake of simplicity, method 200 will be described in the context of the scenario of sub-step 214 in which the source LUN is thick LUN 36.

Sub-steps 216, 218 represent two alternate scenarios in which method 200 may be employed. In sub-step 216, the source LUN is remote (e.g., thick LUN 36 on remote source DSS 35). For example, this might be the case if a user is migrating from a legacy DSS 35 to a new DSS 32. In sub-step 218, the source LUN 36 is local (e.g., it is located on the very same DSS computing device 32 on which the MO 48 is running).

In response to step 210, MO 48 sends an instruction 71 to the MLU 51 instructing that a new thinly-provisioned LUN 64 be created with various parameters (e.g., size, storage tier, etc.) matching the setup parameters of the source thick LUN 36. Instruction 71 also instructs that a Zero Detect mode 66 of the new thin LUN 64 be set to be in an active mode.

Optional step 230, which may be performed in parallel with step 220 (i.e., either before, after, or at the same time as step 220), is performed when thick LUN 36 is on a source DSS 35 remote from the DSS computing device 32. In step 230, MO 48 reads data 74 from the thick LUN 36 on the source DSS 35 across network 34 into cache 55 of the DSS computing device 32. This may be done by sending a read command 73 (e.g., a SCSI read command, an NFS read command, a CIFS read command, etc.) across network 34 to source DSS 35, which causes the data 74 to be sent and written to cache 55. In some embodiments, the entire thick LUN 36 is copied into cache 55 at once, while in other embodiments, MO 48 splits the migration operation into several sub-operations, copying only a subset 74 (e.g., 32 megabytes) of the thick LUN 36 into cache 55 at once. In these split embodiments, steps 230-280 are repeated until all data 74 has been transferred.

If, however, the thick LUN 36 is already local to DSS computing device 32 (i.e., already stored within persistent storage 44 of DSS computing device 32), then step 230 is omitted.

Steps 240 and 250 are optional in the sense that these steps may not always be performed, depending on the embodiment. In some embodiments, steps 240 and 250 are only performed if the data 74 is stored either in cache 55 or on persistent storage 44 of DSS computing device 32. In other embodiments, even if the data 74 is stored in cache 55 or on persistent storage 44 of DSS computing device 32, MO 48 may skip directly to step 260 for increased efficiency.

In step 240, MO 48 sends a data-copy-avoidance (DCA) write command 71 to MLU 51. This DCA write command 71 is unbuffered because it does not include a buffer with the data as part of the write command 71. Rather, it points to a location in either cache or persistent storage 44 where the data is found. Because the Zero Detect mode 66 of the thin LUN 64 is set in active mode, there is no need for MO 48 to set the ZD flag 120 of the write command 71 to affirmative. MO 48 initially sends the DCA write command 71 because DCA is the default mode for any write from data already in cache 55 or on persistent storage 44, due to the ability to avoid extra data transfers.

However, because write command 71 is unbuffered and the Zero Detect mode 66 of the thin LUN 64 is set in active mode, ZD fixture 63 will not allow the write to proceed, since it is not able to search for zero blocks 65 within the data 74. Therefore, operation proceeds to step 250, in which MO 48 receives a failure signal 78 from MLU 51. Because the DCA write command 71 has failed, MO 48 will try again with a buffered write 81.

In step 260, MO 48 sends a buffered write command 81 to MLU 51 with buffer 68. In some embodiments, in order to fill buffer 68, MO 48 first issues a command (not depicted) to copy data 79 from cache 55 or persistent storage 44 (or, in some embodiments, from another location) into buffer 68. Once buffer 68 has been filled with the data 79, MO 48 then sends the buffered write command 81 to the MLU 51.

In step 270, unless there is some other error, MO 48 receives completion signal 96 from MLU 51 indicating that the buffered write command 81 has completed successfully.

In step 280, MO 48 may then determine whether or not the migration operation is complete. For example, if only a subset 74 of the data of thick LUN 36 is transferred to cache 55 at a time, operation proceeds back to step 230. As another example, if only a portion 79 of the data is sent to buffer 68 at a time (e.g., if buffer 68 has a limited size, such as 32 megabytes), operation may proceed back to step 260.

Once the migration operation has completed, operation proceeds with step 290, in which MO 48 directs MLU 51 to switch the Zero Detect mode 66 of the thin LUN 64 to passive mode. Then, unbuffered writes 71 will be allowed to that thin LUN 64, as long as the ZD flag 120 of those unbuffered writes are set to negative.

Figure 4:
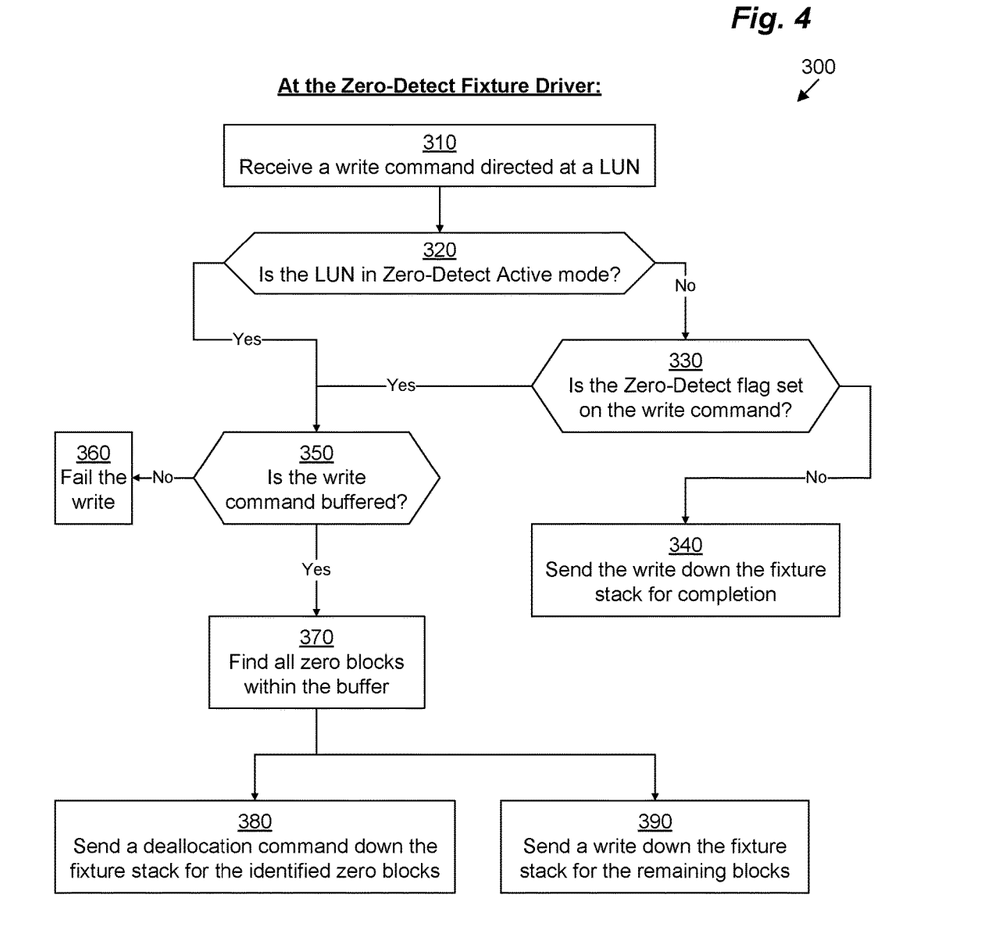
FIG. 4 is a flowchart depicting example methods of various embodiments.

FIG. 4 illustrates an example method 300 performed by ZD fixture 63 of DSS computing device 32. It should be understood that, within FIG. 4, various steps or sub-steps of method 300 may be omitted in some embodiments. Similarly, in some embodiments, one or more steps or sub-steps may be combined together or performed in a different order. Method 300 is performed by DSS computing device 32, more specifically by ZD fixture 63 running on processing circuitry 38 in conjunction with various other system components.

In step 310, ZD fixture 63 receives a write IOD 76, 81 directed at a thin LUN 64 from upper arm 50 via the fixture stack 60. Write IOD 76, 81 may be issued by the upper arm 50 in response to having received a write command 71, 80. Write command 71, 80 may come from a host 31, MO 48, or from another driver in the stack 46.

In response, in step 320, ZD fixture 63 determines whether or not the thin LUN 64 is in the active ZD mode 66. If it is, then operation proceeds with step 350. Otherwise, operation proceeds with step 330.

In step 330, ZD fixture 63 determines whether or not the ZD flag 120 of the write IOD 76, 81 is set to affirmative. If it is, then operation proceeds with step 350. Otherwise, operation proceeds with step 340.

In step 340, the zero detection feature is not enabled, so ZD fixture 63 just forwards the write IOD 76, 81 down the fixture stack 60 for completion by the I/O coordination module 56.

In step 350, the zero detection feature is enabled, so ZD fixture 63 determines whether or not the write IOD 76, 81 reflects a buffered write. If it does, then operation proceeds with step 370. Otherwise, operation proceeds with step 360.

In step 360, since write IOD 76, 81 reflects an unbuffered write but zero detection is enabled, the write must fail, since the buffer 68 is not available for inspection. Thus, ZD fixture 63 responds by sending failure signal 77 up the fixture stack 60 to the upper arm 50.

In step 370, ZD fixture 63 inspects the buffer 68 to locate any zero blocks 65 (i.e., blocks that are entirely empty).

If there are any zero blocks 65 within buffer 68, then, in step 380, ZD fixture 63 sends a deallocation command (e.g., IOD 82) down the fixture stack 60 for the identified zero blocks 65. This allows the I/O coordination module 56 to deallocate backing store for those identified zero blocks 65.

If there are (also) any non-zero data blocks 67 within buffer 68, then, in step 390, ZD fixture 63 sends a write command (e.g., IOD 86) down the fixture stack 60 for the non-zero data blocks 67. This allows the I/O coordination module 56 to perform the write for non-zero data blocks 67 to cache 55 or persistent storage 44.

Figure 5:
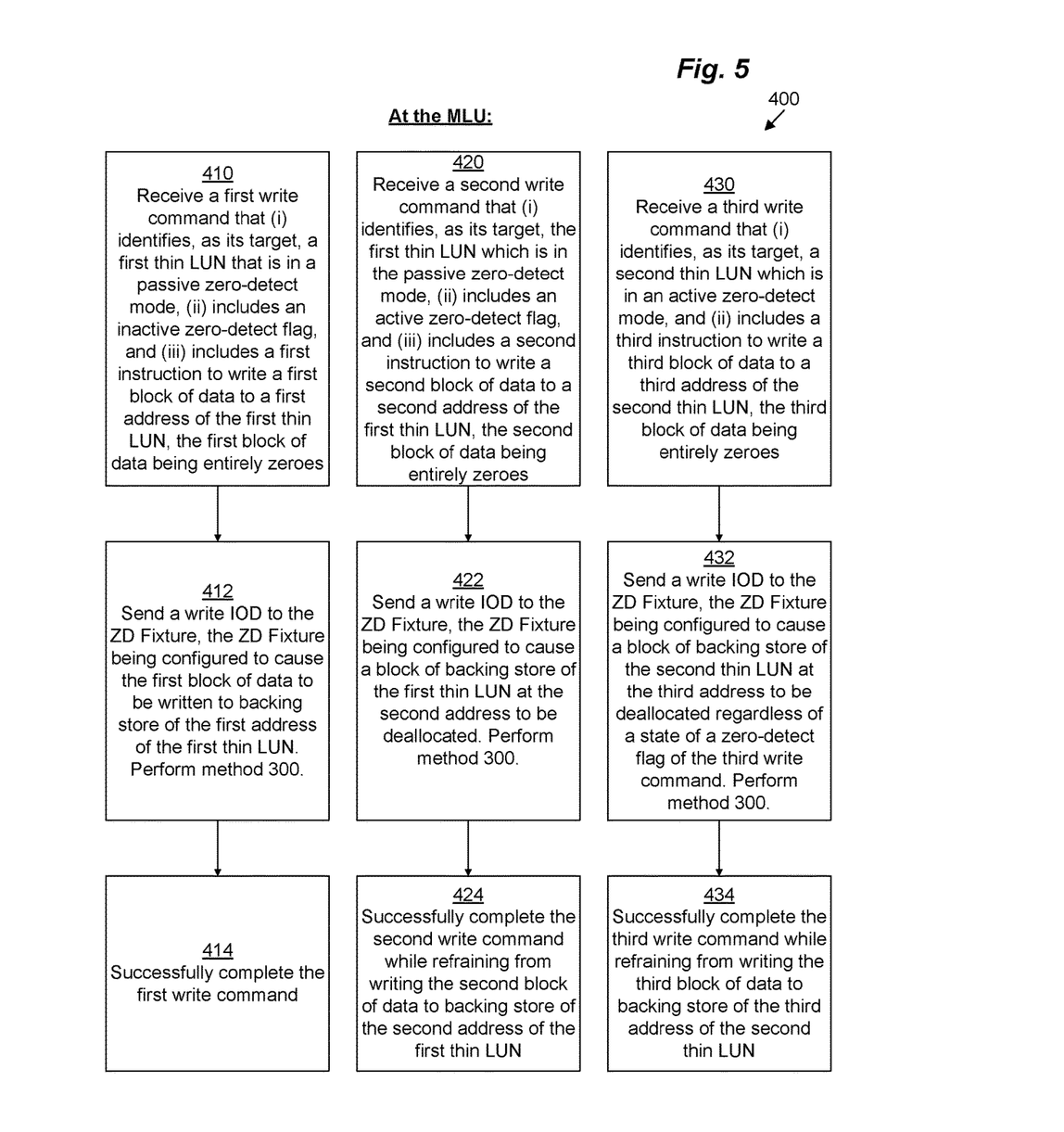
FIG. 5 is a flowchart depicting example methods of various embodiments.

FIG. 5 illustrates an example method 400 performed by MLU 51 of DSS computing device 32. It should be understood that, within FIG. 5, various steps or sub-steps of method 400 may be omitted in some embodiments. Similarly, in some embodiments, one or more steps or sub-steps may be combined together or performed in a different order. Method 400 is performed by DSS computing device 32, more specifically by MLU 51 running on processing circuitry 38 in conjunction with various other system components.

Steps 410, 420, and 430 may be performed in parallel (either sequentially, simultaneously, or in an overlapping manner, with no necessary order).

In step 410, MLU 51 receives a first write command 71, 80 that (i) identifies, as its target, a first thin LUN 64 that is in a passive zero-detect mode 66, (ii) includes an inactive zero-detect flag 120, and (iii) includes a first instruction to write a first block 65 of data to a first address of the first thin LUN 64, the first block 65 of data being entirely zeroes.

Then, in step 412, upper arm 51 of MLU 51 sends a write IOD 76, 81 to the ZD fixture 63. ZD fixture 63 performs method 300. Since the zero detection mode is not enabled, ZD fixture 63 causes the first block 65 of data to be written to backing store (i.e., either cache 55 or persistent storage 44) of the first address of the first thin LUN 64. In step 414, MLU 51 successfully completes the first write command.

In step 420, MLU 51 receives a second write command 71, 80 that (i) identifies, as its target, the same first thin LUN 64 that is in the passive zero-detect mode 66, (ii) includes an active zero-detect flag 120, and (iii) includes a second instruction to write a second block 65 of data to a second address of the first thin LUN 64, the second block 65 of data being entirely zeroes. Then, in step 422, upper arm 51 of MLU 51 sends a write IOD 76, 81 to the ZD fixture 63. ZD fixture 63 performs method 300. Since the zero detection mode is now enabled due to the active zero-detect flag 120, ZD fixture 63 causes a block of backing store of the first thin LUN 64 at the second address to be deallocated. In step 424, MLU 51 successfully completes the second write command while refraining from writing the second block 65 of data to backing store of the second address of the first thin LUN 64.

In step 430, MLU 51 receives a third write command 71, 80 that (i) identifies, as its target, a second, different, thin LUN 64 that is in the active zero-detect mode 66, and (ii) includes a third instruction to write a third block 65 of data to a third address of the second thin LUN 64, the second block 65 of data being entirely zeroes. Then, in step 432, upper arm 51 of MLU 51 sends a write IOD 76, 81 to the ZD fixture 63. ZD fixture 63 performs method 300. Since the zero detection mode is now enabled due to the active zero-detect mode 66, ZD fixture 63 causes a block of backing store of the second thin LUN 64 at the third address to be deallocated regardless of a state of a zero-detect flag 120 of the third write command 71, 80. In step 434, MLU 51 successfully completes the third write command while refraining from writing the third block 65 of data to backing store of the third address of the second thin LUN 64.

Thus, techniques have been presented for implementing a zero detection feature in the middle of a I/O driver stack 46, 60 that is able to function properly on migration of a thickly-provisioned logical disk 36 (or a thinly-provisioned logical disk that inefficiently contains empty blocks 37) to a thinly-provisioned logical disk 64. This may be accomplished by creating the destination thinly-provisioned logical disk 64 with a Zero Detect mode 66 that is initially set to active upon a migration. The zero detection feature implemented in the middle of the I/O driver stack 46, 60 is configured to require any writes to a logical disk to be buffered when that logical disk is in active Zero Detect mode 66, and to automatically apply zero detection to such writes to prevent writing entire blocks 65 of zeroes. The Zero Detect mode 66 may then be set to passive upon completion of the migration, allowing zero detection to be applied only to select write operations in the normal course of operation.

While various embodiments of the present disclosure have been particularly shown and described, it will be understood by those skilled in the art that various changes in form and details may be made therein without departing from the spirit and scope of the present disclosure as defined by the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

It should be understood that all embodiments that have been described may be combined in all possible combinations with each other, except to the extent that such combinations have been explicitly excluded.

Finally, even if a technique, method, apparatus, or other concept is specifically labeled as "background" or "conventional," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method of storing data in the data storage system (DSS), the method comprising:
    in response to receiving, by a mapping driver executing on the DSS, a first write command that (i) identifies, as its target, a first thinly-provisioned logical disk of storage (LUN) that is in a passive zero-detect mode, (ii) includes an inactive zero-detect flag, and (iii) includes a first instruction to write a first block of data to a first address of the first thinly-provisioned LUN, the first block of data being entirely zeroes:
        writing the first block of data to backing store of the first address of the first thinly-provisioned LUN, and successfully completing the first write command;
    in response to receiving, by the mapping driver, a second write command that (i) identifies, as its target, the first thinly-provisioned LUN which is in the passive zero-detect mode, (ii) includes a active zero-detect flag, and (iii) includes a second instruction to write a second block of data to a second address of the first thinly-provisioned LUN, the second block of data being entirely zeroes:
        deallocating a block of backing store of the first thinly-provisioned LUN at the second address, and
        successfully completing the second write command while refraining from writing the second block of data to backing store of the second address of the first thinly-provisioned LUN; and
    in response to receiving, by the mapping driver, a third write command that (i) identifies, as its target, a second thinly-provisioned LUN which is in an active zero-detect mode, and (ii) includes a third instruction to write a third block of data to a third address of the second thinly-provisioned LUN, the third block of data being entirely zeroes:
        deallocating a block of backing store of the second thinly-provisioned LUN at the third address regardless of a state of a zero-detect flag of the third write command, and
        successfully completing the third write command while refraining from writing the third block of data to backing store of the third address of the second thinly-provisioned LUN.

2. The method of claim 1 wherein:
    the method further comprises, in response to receiving, by the mapping driver, a fourth write command that (i) identifies, as its target, the second thinly-provisioned LUN which is in the active zero-detect mode, (ii) includes a fourth instruction to write the third block of data to the third address of the second thinly-provisioned LUN, the third block of data being entirely zeroes, and (iii) is a data-copy-avoidance unbuffered write operation:
        failing the fourth write command; and
        sending a failure signal to an originating driver of the fourth write command;
    the third write command is received by the mapping driver in response to sending the failure signal to the originating driver; and
    the third write command is a buffered write command that includes a buffer of data to be written to the second thinly-provisioned LUN.

3. The method of claim 1 wherein the method further comprises, subsequent to successfully completing the third write command:
    receiving a switch instruction to switch the second LUN to the passive zero-detect mode;
    in response to receiving, by the mapping driver, subsequent to receiving the switch instruction, a fourth write command that (i) identifies, as its target, the second thinly-provisioned LUN, which is in the passive zero-detect mode, (ii) includes an inactive zero-detect flag, and (iii) includes a fourth instruction to write a fourth block of data to a fourth address of the second thinly-provisioned LUN, the fourth block of data being entirely zeroes:
        writing the fourth block of data to backing store of the fourth address of the second thinly-provisioned LUN, and
        successfully completing the fourth write command;
    in response to receiving, by the mapping driver, subsequent to receiving the switch instruction, a fifth write command that (i) identifies, as its target, the second thinly-provisioned LUN which is in the passive zero-detect mode, (ii) includes an active zero-detect flag, and (iii) includes a fifth instruction to write a fifth block of data to a fifth address of the second thinly-provisioned LUN, the fifth block of data being entirely zeroes:
        deallocating another block of backing store of the second thinly-provisioned LUN at the fifth address, and
        successfully completing the fifth write command while refraining from writing the fifth block of data to backing store of the fifth address of the second thinly-provisioned LUN.

4. The method of claim 1 wherein:
    the third write command further (iv) includes a fourth instruction to write a fourth block of data to a fourth address of the second thinly-provisioned LUN, the fourth block of data including non-zero data; and
    the method further comprises, in response to receiving the third write command, writing the fourth block of data to backing store of the fourth address of the second thinly-provisioned LUN.

5. The method of claim 1 wherein the method further comprises, at an orchestration driver running on the DSS:
    receiving a migration command to migrate a third LUN to the second LUN, the third LUN including the third block of data;
    in response to receiving the migration command, creating the second LUN with the active zero-detect mode;
    in response to creating the second LUN with the active zero-detect mode, sending the third write command to the mapping driver, the third write command encoding a copy operation from the third LUN to the second thinly-provisioned LUN.

6. The method of claim 5 wherein the third LUN is a thickly provisioned LUN.

7. The method of claim 5 wherein:
the third LUN resides on another DSS remote from the DSS; and
sending the third write command to the mapping driver includes the orchestration driver remotely reading data from the third LUN across a network connection into a cache of the DSS.

8. The method of claim 7 wherein:
in response to creating the second LUN with the active zero-detect mode, prior to sending the third write command to the mapping driver, the method further comprises:
sending, from the orchestration driver to the mapping driver, a fourth write command that (i) identifies, as its target, the second thinly-provisioned LUN which is in the active zero-detect mode, (ii) includes a fourth instruction to write the third block of data to the third address of the second thinly-provisioned LUN, the third block of data being entirely zeroes, and (iii) is a data-copy-avoidance unbuffered write operation from the cache; and
in response to receiving, by the mapping driver, the fourth write command:
failing the fourth write command; and
sending a failure signal to the orchestration driver;
the third write command is received by the mapping driver in response to sending the failure signal to the orchestration driver; and
the third write command is a buffered write command that includes a buffer of data to be written to the second thinly-provisioned LUN.

9. The method of claim 7 wherein the method further comprises, subsequent to the orchestration driver successfully completing the migration command:
switching the second LUN to the passive zero-detect mode;
in response to receiving, by the mapping driver, subsequent to switching the second LUN to the passive zero-detect mode, a fourth write command that (i) identifies, as its target, the second thinly-provisioned LUN, which is in the passive zero-detect mode, (ii) includes an inactive zero-detect flag, and (iii) includes a fourth instruction to write a fourth block of data to a fourth address of the second thinly-provisioned LUN, the fourth block of data being entirely zeroes:
writing the fourth block of data to backing store of the fourth address of the second thinly-provisioned LUN, and
successfully completing the fourth write command;
in response to receiving, by the mapping driver, subsequent to switching the second LUN to the passive zero-detect mode, a fifth write command that (i) identifies, as its target, the second thinly-provisioned LUN which is in the passive zero-detect mode, (ii) includes an active zero-detect flag, and (iii) includes a fifth instruction to write a fifth block of data to a fifth address of the second thinly-provisioned LUN, the fifth block of data being entirely zeroes:
deallocating another block of backing store of the second thinly-provisioned LUN at the fifth address, and
successfully completing the fifth write command while refraining from writing the fifth block of data to backing store of the fifth address of the second thinly-provisioned LUN.

10. The method of claim 5 wherein:
the third LUN resides on the DSS;
in response to creating the second LUN with the active zero-detect mode, prior to sending the third write command to the mapping driver, the method further comprises:
sending, from the orchestration driver to the mapping driver, a fourth write command that (i) identifies, as its target, the second thinly-provisioned LUN which is in the active zero-detect mode, (ii) includes a fourth instruction to write the third block of data to the third address of the second thinly-provisioned LUN, the third block of data being entirely zeroes, and (iii) is a data-copy-avoidance unbuffered write operation directly from the third LUN; and
in response to receiving, by the mapping driver, the fourth write command:
failing the fourth write command; and
sending a failure signal to the orchestration driver;
the third write command is received by the mapping driver in response to sending the failure signal to the orchestration driver; and
the third write command is a buffered write command that includes a buffer of data to be written to the second thinly-provisioned LUN.

11. An apparatus comprising:
persistent data storage devices that provide backing store for a set of logical disks of storage (LUNs); and
processing circuitry coupled to memory configured to store data on the set of LUNs by:
in response to receiving, by a mapping driver running on the processing circuitry coupled to memory, a first write command that (i) identifies, as its target, a first thinly-provisioned LUN that is in a passive zero-detect mode, (ii) includes an inactive zero-detect flag, and (iii) includes a first instruction to write a first block of data to a first address of the first thinly-provisioned LUN, the first block of data being entirely zeroes:
writing the first block of data to backing store of the first address of the first thinly-provisioned LUN, and
successfully completing the first write command;
in response to receiving, by the mapping driver, a second write command that (i) identifies, as its target, the first thinly-provisioned LUN which is in the passive zero-detect mode, (ii) includes a active zero-detect flag, and (iii) includes a second instruction to write a second block of data to a second address of the first thinly-provisioned LUN, the second block of data being entirely zeroes:
deallocating a block of backing store of the first thinly-provisioned LUN at the second address, and
successfully completing the second write command while refraining from writing the second block of data to backing store of the second address of the first thinly-provisioned LUN; and
in response to receiving, by the mapping driver, a third write command that (i) identifies, as its target, a second thinly-provisioned LUN which is in an active zero-detect mode, and (ii) includes a third instruction to write a third block of data to a third address of the second thinly-provisioned LUN, the third block of data being entirely zeroes:
deallocating a block of backing store of the second thinly-provisioned LUN at the third address regardless of a state of a zero-detect flag of the third write command, and successfully completing the third write command while refraining from writing the third block of data to backing store of the third address of the second thinly-provisioned LUN.

12. A computer program product comprising a non-transitory computer-readable storage medium storing a set of instructions, which, when executed by a data storage system (DSS) computing device, causes the DSS computing device to store data therein by:

in response to receiving, by a mapping driver executing on the DSS computing device, a first write command that (i) identifies, as its target, a first thinly-provisioned logical disk of storage (LUN) that is in a passive zero-detect mode, (ii) includes an inactive zero-detect flag, and (iii) includes a first instruction to write a first block of data to a first address of the first thinly-provisioned LUN, the first block of data being entirely zeroes:

writing the first block of data to backing store of the first address of the first thinly-provisioned LUN, and successfully completing the first write command;

in response to receiving, by the mapping driver, a second write command that (i) identifies, as its target, the first thinly-provisioned LUN which is in the passive zero-detect mode, (ii) includes a active zero-detect flag, and (iii) includes a second instruction to write a second block of data to a second address of the first thinly-provisioned LUN, the second block of data being entirely zeroes:

deallocating a block of backing store of the first thinly-provisioned LUN at the second address, and successfully completing the second write command while refraining from writing the second block of data to backing store of the second address of the first thinly-provisioned LUN; and in response to receiving, by the mapping driver, a third write command that (i) identifies, as its target, a second thinly-provisioned LUN which is in an active zero-detect mode, and (ii) includes a third instruction to write a third block of data to a third address of the second thinly-provisioned LUN, the third block of data being entirely zeroes:

deallocating a block of backing store of the second thinly-provisioned LUN at the third address regardless of a state of a zero-detect flag of the third write command, and successfully completing the third write command while refraining from writing the third block of data to backing store of the third address of the second thinly-provisioned LUN.

* * * * *